UNITED STATES PATENT OFFICE

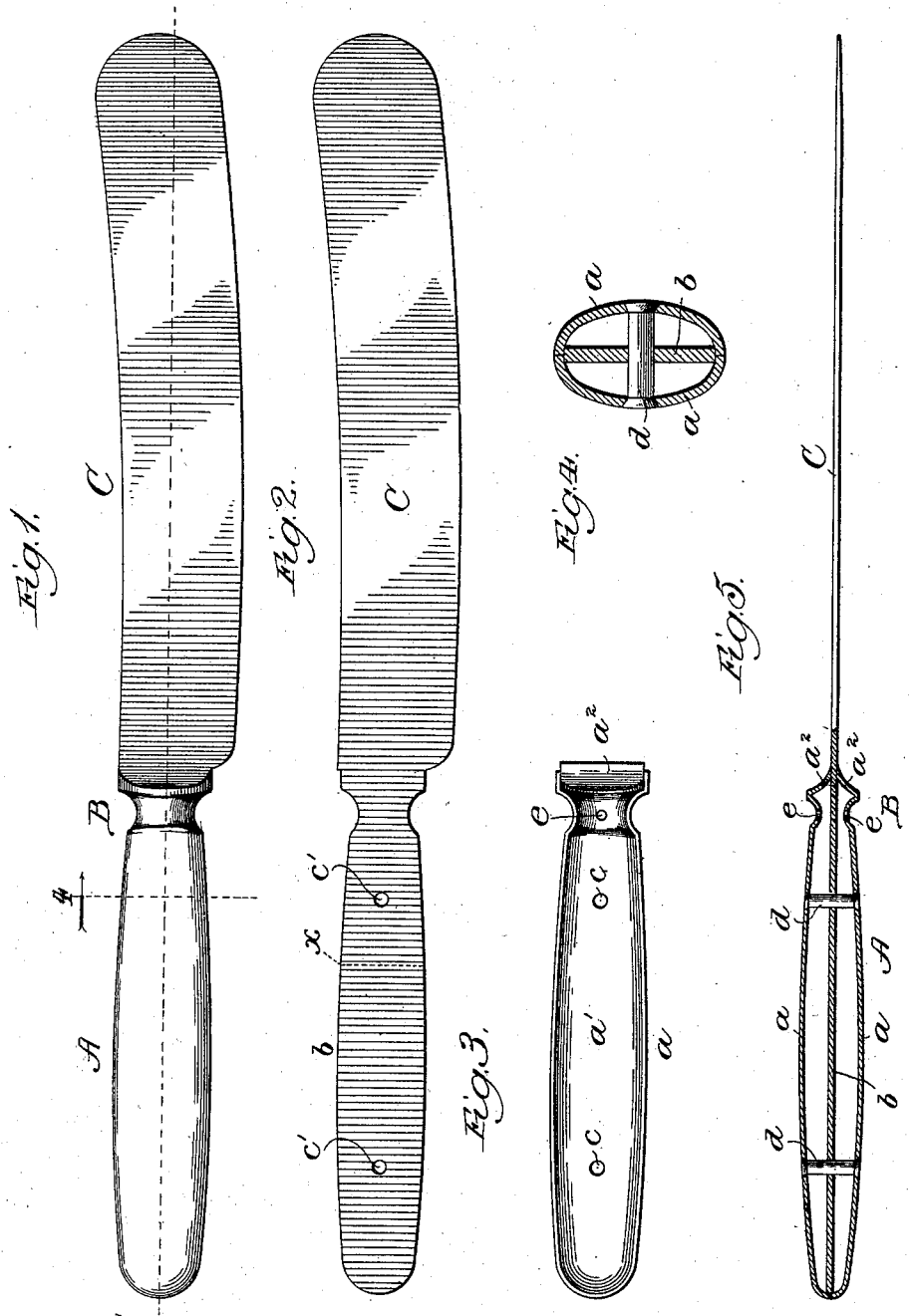

ISAAC HIRSCH, OF CHICAGO, ILLINOIS.

KNIFE.

SPECIFICATION forming part of Letters Patent No. 656,457, dated August 21, 1900.

Application filed May 11, 1900. Serial No. 16,256. (No model.)

*To all whom it may concern:*

Be it known that I, ISAAC HIRSCH, a citizen of the United States, residing at Chicago, in the county of Cook and State of Illinois, have invented a new and useful Improvement in Knives, of which the following is a specification.

My invention relates to an improvement in handles for cutlery generally, and more especially for table-knives; and it consists in the improved article of manufacture as well as in a novel and improved method of manufacture.

My object is to provide a cutlery-handle which will give to the article the appearance of being formed throughout in one piece and which will be particularly light, strong, durable, inexpensive to manufacture, and desirable in use.

In the drawings, Figure 1 shows a finished table-knife of my improved construction; Fig. 2, a view of the knife-blade and a tang formed integral therewith; Fig. 3, an inner side of one of a pair of scales which form the handle and bolster portion of the knife; Fig. 4, an enlarged section taken on line 4 of Fig. 1, and Fig. 5 a section taken on line 5 of Fig. 1.

A, B, and C are respectively the handle, bolster, and blade portions of a table-knife. The handle A and bolster B are hollow and formed of two similarly-constructed scales $a$, fitting together along their edge portions. The blade C has a tang $b$, preferably of the exact outline and size of the inner edge portions of the scales, so that when the scales are fitted together over the tang the latter is held immovably in place. Each scale $a$ is stamped out of sheet metal to produce the concavo-convex part $a'$, which forms one side of the handle A, and the part $a^2$, which forms one side of the bolster B. The scales and tang are provided, preferably, with coincident rivet-holes $c\ c'$.

In the manufacture of the knife the scales $a$ are fitted together over the tang $b$, and rivets $d$ are passed through the holes $c\ c'$ to hold the parts together. This rivet-fastening is for the purpose merely of holding the parts against relative movement during the subsequent welding or brazing operation by which the scales and tang are fastened rigidly together, and the parts $a^2$ are fastened against opposite sides of the knife-blade. The rivets $d$ may be dispensed with and the parts held together by means of wires wrapped around the scales. I prefer, however, to employ the rivets, because they do not interfere in any way with the welding or brazing operation and tend in a measure to strengthen the handle portion. Although the parts may be welded together, I prefer to fasten them by dipping the handle and bolster portions into liquefied brazing material, which fills the joints, fastens the parts together with great security, and gives to the finished article the appearance of being formed throughout in one piece. It is usual and desirable to plate the entire knife, or at least the handle and bolster portions, with silver or nickel by dipping them into a proper solution. In the case of a hollow handle and bolster it is necessary that all the joints shall be completely closed to render them liquid excluding, otherwise in the plating operation and later in the immersion of the knife into water the handle and bolster portion will be filled with liquid.

I have found in practice that, particularly in the brazing operation, owing to the heat of the brazing material the air in the handle and bolster portion expands and forces its way through the joints between opposite parts of the bolster or between the bolster and knife-blade, with the result that openings are left which are difficult to close and will admit liquid. To overcome this objection, I provide either one or both the scales at the bolster portion with a small opening $e$, which operates as a vent which will admit very little of the brazing material, but permits the air to escape. By employing the vent opening or openings all the joints between the scales themselves and between them and the knife-blade are completely closed by the brazing material, and previous to plating the hole or holes $e$ may be plugged with a rivet or the like. After the plating operation none of the rivets $d$ or plugs at the openings $e$ can be seen.

I prefer to provide a tang $b$, as described, to extend the full length of the interior of the handle. It thus contributes sufficient weight to cause the handle to overbalance the blade, and thus maintain the blade out of contact with the surface on which the knife rests. If desired, however, the tang may extend no further than the dotted line x in Fig. 2 and will still serve to maintain the parts rigid.

A knife constructed as described is particularly strong and light, as well as attractive in appearance. By stamping the scales out of sheet metal, with the bolster portions integral therewith, I produce a particularly inexpensive and desirable construction, rendered particularly strong when the parts are brazed or welded together, as described.

My invention is applicable to all kinds of table-cutlery, whether knives, forks, or steels, and by the term "blade" I intend to include the cutting portion of a knife, the pronged portion of a fork, or the sharpening portion of a steel.

What I claim as new, and desire to secure by Letters Patent, is—

1. The method of forming the handle and bolster portions of an article of cutlery which consists in stamping two scales, which fitted together form said portions, out of sheet metal, forming the cutlery-blade with a flat tang of the width and outline of the inner edges of the scales, fastening the scales against opposite sides of the blade, to house and contact with the edges of the tang, and then securing the parts together and hermetically sealing all the joints between them with molten metal, substantially as set forth.

2. The method of forming the handle and bolster portions of an article of cutlery which consists in stamping two scales, which fitted together form said portions, out of sheet metal, forming the cutlery-blade with a flat tang of the width and outline of the inner edges of the scales, fastening the scales against opposite sides of the blade, to house and contact with the edges of the tang, providing a vent-opening in the bolster portion, securing the parts together and hermetically sealing all the joints between them with molten metal, and then plugging said vent-opening, substantially as set forth.

3. As a new article of manufacture, an article of table-cutlery having a blade and flat tang formed integral, and a handle and bolster portion formed of sheet-metal scales fitting against opposite sides of the blade and housing and contacting with the edges of the tang, all the parts being secured together and the joints between them hermetically sealed with molten metal, substantially as described.

ISAAC HIRSCH.

In presence of—
D. W. LEE,
A. D. BACCI.